United States Patent [19]
Terayama et al.

[11] Patent Number: 5,239,633
[45] Date of Patent: Aug. 24, 1993

[54] DATA PROCESSOR EXECUTING MEMORY INDIRECT ADDRESSING AND REGISTER INDIRECT ADDRESSING

[75] Inventors: Fumihiko Terayama; Yuichi Saitou; Toyohiko Yoshida, all of Itami, Japan

[73] Assignee: Mitsubishi Denki Kabushiki Kaisha, Tokyo, Japan

[21] Appl. No.: 497,375

[22] Filed: May 4, 1990

[30] Foreign Application Priority Data

Mar. 24, 1989 [JP] Japan ................ 1-72623

[51] Int. Cl.$^5$ .......... G06F 9/00; G06F 9/30; G06F 9/34; G06F 9/38
[52] U.S. Cl. .................. 395/375; 364/231.8
[58] Field of Search ......... 364/200, 900, 231.8; 395/400, 375

[56] References Cited

U.S. PATENT DOCUMENTS

| | | | |
|---|---|---|---|
| 3,793,631 | 2/1974 | Silverstein et al. | 364/200 |
| 3,794,970 | 2/1974 | Pearson et al. | 364/200 |
| 4,156,278 | 5/1979 | Wilhite | 364/200 |
| 4,156,906 | 5/1979 | Ryan | 364/200 |
| 4,161,026 | 7/1979 | Wilhite | 364/200 |
| 4,225,922 | 9/1980 | Porter | 364/200 |
| 4,313,158 | 1/1982 | Porter et al. | 364/200 |
| 4,402,042 | 8/1983 | Guttag | 364/200 |
| 4,907,147 | 3/1990 | Saito et al. | 395/375 |

OTHER PUBLICATIONS

"Branch Prediction Strategies & Design," pp. 7–22 Computer, Jan. 1984.

Primary Examiner—Dale M. Shaw
Assistant Examiner—D. Dinh
Attorney, Agent, or Firm—Townsend and Townsend Khourie and Crew

[57] ABSTRACT

A data processor which comprises a pipeline processing mechanism for executing memory indirect addressing and register indirect addressing in an address calculation stage, checks whether or not an instruction writes an operand to a memory or register, makes each stage of the pipeline mechanism hold reservation information thereof in sequence, thereby reduces the frequency of stops of pipeline processing caused by processing of operand address calculation of the following instruction attending on a writing of the operand of the preceding instruction to a memory or register, so that data processing can be execute at a higher efficiency.

3 Claims, 5 Drawing Sheets

Fig. 2
Prior Art

| STAGE \ CYCLE | T1 | T2 | T3 | T4 | T5 | T6 | T7 | T8 |
|---|---|---|---|---|---|---|---|---|
| INSTRUCTION DECODING STAGE | I1 | I2 | I3 | I3 | I3 | | | |
| ADDRESS CALCULATION STAGE | | I1 | I2 | I2 | I2 | I3 | | |
| OPERAND FETCH STAGE | | | I1 | | | | I3 | |
| EXECUTION STAGE | | | | I1 | | | I2 | I3 |

DATA PROCESSOR EXECUTING MEMORY INDIRECT ADDRESSING AND REGISTER INDIRECT ADDRESSING

BACKGROUND OF THE INVENTION

1. Field of the Invention

The present invention relates to a data processor executing pipeline processing, and specifically relates to a data processor executing memory indirect addressing and register indirect addressing in an address calculation stage.

2. Description of Related Art

A pipeline processing system has been employed for increasing the processing speed of the data processor.

The pipeline processing system increases throughput by dividing instruction processing and simultaneously executing a plurality of instructions in a data processor, and thereby increases the apparent speed of executing one instruction. For example, in a data processor constructed so as to execute one instruction in a pipeline of four stages of instruction decoding, operand address calculation, operand fetch and operation execution, a maximum of four instructions are executed simultaneously in the respective processing stages. On the other hand, in a data processor executing processing an instruction one by one, only after all processings of instruction decoding, operand address calculation, operand fetch and operation execution for one instruction have been completed, the next instruction processing can be executed. Accordingly, the data processor executing pipeline processing can have an instruction processing speed apparently quadruple in comparison with the data processor executing processing an instruction one by one.

To further increase the processing speed of the data processor, it is required to raise the efficiency of pipeline processing. To raise the efficiency of pipeline processing, it is required that load of each stage of pipeline is equal, each stage processes data in same clock cycle, and pipeline processing progresses one after another.

Causes of disturbing progress of continued data processing in the pipeline include jump instruction, exception, interruption, conflict between instructions in the pipeline and the like. One of the major conflicts in the pipeline is that the operand address calculation stage refers to a general-purpose register or a memory whereto the operation execution stage writes data before a writing thereof.

To correctly execute instructions following a program, the operand address calculation stage must refer to a general-purpose register or a memory after the operation execution stage has completed a writing to the general-purpose register or the memory.

FIG. 1 is a circuit block diagram explaining a conventional pipeline controlling mechanism.

In FIG. 1, numeral 41 designates an instruction decoder, which decodes an instruction, outputs a register writing reservation signal to a set input of an SR (set reset flip-flop 42 for register writing processing, and outputs a memory writing reservation signal to a set input of a SR flip-flop 43 for memory writing processing. The SR flip-flop 42 for register writing processing and the SR flip-flop 43 for memory writing processing are reset by reset signals RS1 and RS2 from an operation processing part 44, respectively.

FIG. 2 is a status view explaining changes of pipeline processing.

In FIG. 2, numeral 51 designates an instruction decoding stage, numeral 52 designates an address calculation stage, numeral 53 designates an operand fetch stage, numeral 54 designates an operation execution stage, T1 through T8 designate processing cycles, and I1 through I3 designate instructions flowing through the pipeline.

Next, description is made on a conventional pipeline controlling sequence attending on a writing to a register or a memory in reference to FIG. 1.

The instruction decoder 41 checks if an inputted instruction writes data to a register or a memory in the operation processing part 44. Subsequently, when it writes to the memory, it outputs a memory writing reservation signal to set the SR flip-flop 43 to "1". The set value of the SR flip-flop 43 is reset to "0" when processing of the instruction, which set "1" to the SR flip-flop 43, in the operation processing part 44 is completed, and thereafter the instruction processing is resumed.

Like the case of a writing to a memory, also in writing to a register, the SR flip-flop 42 is set by a register writing reservation signal, and is reset when processing of that instruction is completed in the operation processing part 44. A stage delay by such pipeline control is described in reference to FIG. 2.

For example, when the instruction I1 reserves a writing to a memory, processing of the instruction I2 stops in the processing cycle T3, and decoding processing cannot be executed until the instruction I1 writes data to the memory on the processing cycle T4. A stop signal is reset in the processing cycle T4, and the instruction I2 resumes the processing in the cycle T5. Resultingly, a delay of two cycles takes place for the instruction I2. A similar delay takes place also in the case of register writing reservation.

For this reason, a proposal of improving this problem attending on the register conflict as mentioned above has already been made, for example, as shown in the U.S. patent application Ser. No. 156,271 (based on the Japanese Patent Application No. 62-144394).

However, the conventional method has a problem that when the preceding instruction writes a value to a memory, the following instruction stops operand address calculating processing until the preceding instruction completes a writing to the memory, resulting in a remarkable reduction in the pipeline processing speed.

SUMMARY OF THE INVENTION

The present invention has been achieved to solve the above-mentioned problem, and purposes to provide a data processor which checks the state of writing of an instruction to a memory, makes each stages hold memory writing reservation information in sequence, thereby greatly reduces the frequency of processing stop caused by operand address calculating processing of the following instruction attending on a writing to a memory of the preceding instruction, and thereby can efficiently execute the pipeline processing.

A data processor in accordance with the present invention comprises a plurality of latching means for storing operand address calculation inhibiting information in a first pipeline stage, reservation information writing means for judging presence/absence of memory or register writing access in a second pipeline stage from operation information for the preceding instruction, and for writing a predetermined reservation information to corresponding latching means, transferring means for transferring the predetermined reservation information to corresponding latching means in response to moving of the preceding instruction in the pipe-line processing mechanism, and address calculation inhibiting means for inhibiting address calculation of the operand for the following instruction in the first pipeline stage based on the reservation information written to the latching means corresponding to the second pipeline stage by this writing means.

By such a construction, in the data processor of the present invention, when operation information executing memory or register writing access in the second pipeline stage is outputted with respect to the preceding instruction, the reservation information writing means writes a reservation information to each latching means and transferring means transfers the reservation information to the corresponding latching means in response to moving information in the pipeline mechanism, and when the reservation information is transferred to the latching means corresponding to the second pipeline stage, the address calculation inhibiting means sends a signal of inhibiting operand address calculation for the following instruction in the first pipeline stage to the first pipeline stage, and the address calculation inhibiting means delays a start of operand address calculation execution for the following instruction in the first pipeline stage until writing processing to a memory or register by the second pipeline stage is completed.

Also, a data processor in accordance with the present invention is construction with a pipeline processing mechanism comprising a first pipeline stage executing operand address calculation and a second pipeline stage executing a writing of an operand of the operation result, an operand writing reservation means for reserving a writing of the operand to a memory space in executing processing on a first instruction executing a writing of an operand of the operation result to the memory space, one or a plurality of reservation latching means for holding an output of this operand writing reservation means, a reservation latch clearing means for clearing the contents of one or a plurality of reservation latching means in executing processing on the first instruction in the second pipeline stage, and an operand address calculation inhibiting means for inhibiting operand address calculation in the first pipeline stage based on the content of the reservation latch in executing processing on the second instruction accessing the memory space to calculate operand address in the first pipeline stage.

Furthermore, the data processor is provided with flag information holding means comprised of a series connection of a first flag information holding part which is a one-bit register circuit being inputted an input data signal, an input enable signal and a clear signal and outputting an output signal and a second flag information holding part which is a one-bit register circuit being inputted an input data signal, an input enable signal and a clear signal and outputting an output signal in correspondence to a third pipeline stage and a fourth pipeline stage, respectively, flag information holding state detecting means for detecting the flag information holding state in the flag information holding means while making logical OR operation of each output of the first flag information holding part and the second flag information holding part, and pipeline controlling means comprising means for setting the first flag information holding part when the first instruction is processed in the third pipeline stage, means for transferring the content of the first flag information holding part to the above-mentioned second flag information holding part when processing of the first instruction moves from processing in the third pipeline stage to processing in the fourth pipeline stage, means for sequentially moving information in the flag information holding means by clearing the above-mentioned first flag information holding part, and means for controlling processing on a second instruction accessing a memory space to calculate operand address according to an output of the flag information holding state detecting means.

By such a construction, in the data processor of the present invention, when processing on the first instruction executing a writing of an operand of the calculation result to the memory space, for example, a memory writing instruction is executed in the first pipeline stage, a writing of the operand to the memory space is reserved into the operand writing reservation means, and when processing of the first instruction is executed in the second pipeline stage, the content of the reservation latching means is cleared by the reservation latch clearing means, and when the processing on the second instruction accessing the memory space to calculate the operand address, for example, an instruction accessing a memory by address calculation is executed in the first stage, address calculation of the operand is executed while delayed by the address calculation inhibiting mechanism.

Also, when the pipeline controlling means processes the first instruction, for example, an instruction executing a writing to a memory and other instructions in the third pipeline stage, the first flag information holding part is set, and when processing of the first instruction moves from processing in the third pipeline stage to processing in the fourth pipeline stage, the content of the first flag information holding part is transferred to the second flag information holding part, and by clearing the first flag information holding part, information is moved sequentially in the flag information holding means. Also, the pipeline controlling means controls execution of processing on the second instruction, for example, an instruction of accessing a memory by address calculation according to an output of the flag information holding state detecting means.

The above and further objects and features of the invention will more fully be apparent from the following detailed description with accompanying drawings.

BRIEF DESCRIPTION OF THE DRAWINGS

FIG. 2 is an explanatory view showing a state of transition of instruction processing in the conventional pipeline processing mechanism.

DESCRIPTION OF THE PREFERRED EMBODIMENTS

Hereinafter, description is made on an embodiment of the present invention in reference to drawings.

Figure 1:
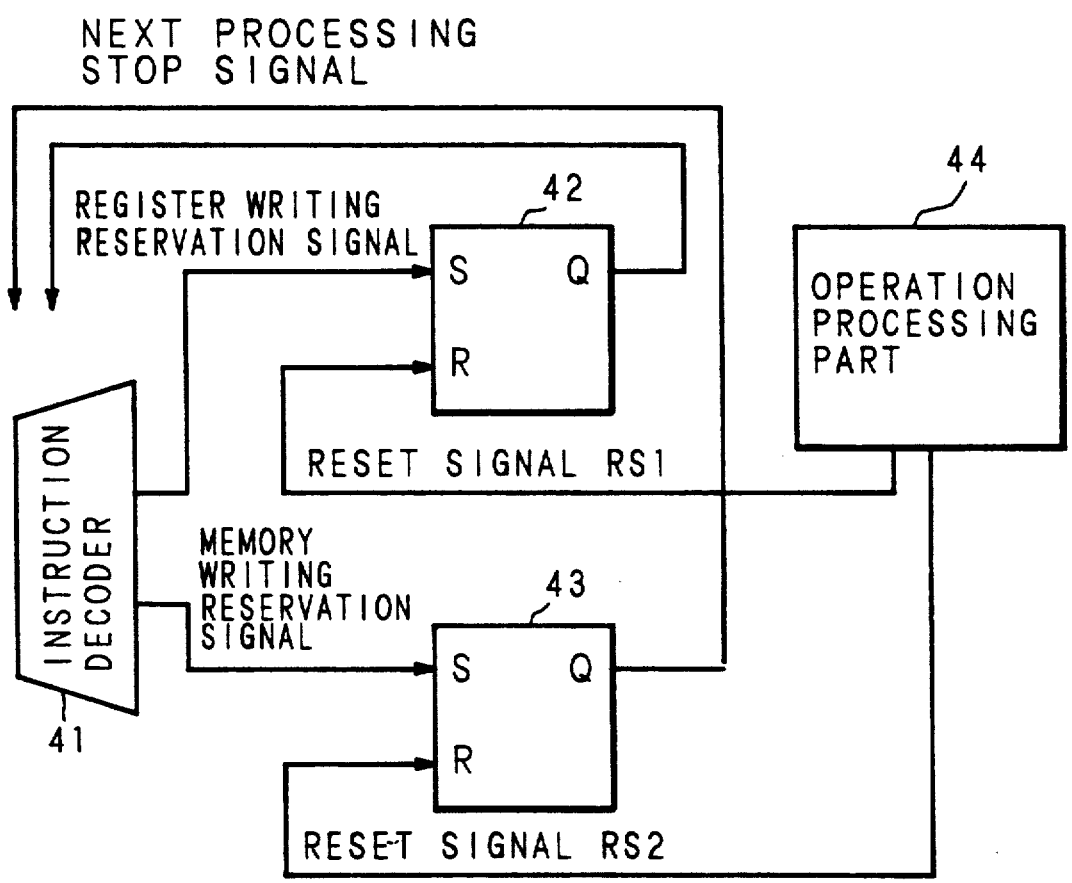
FIG. 1 is a block diagram showing an example of a controlling circuit of a conventional general pipeline processing mechanism.
Figure 3:
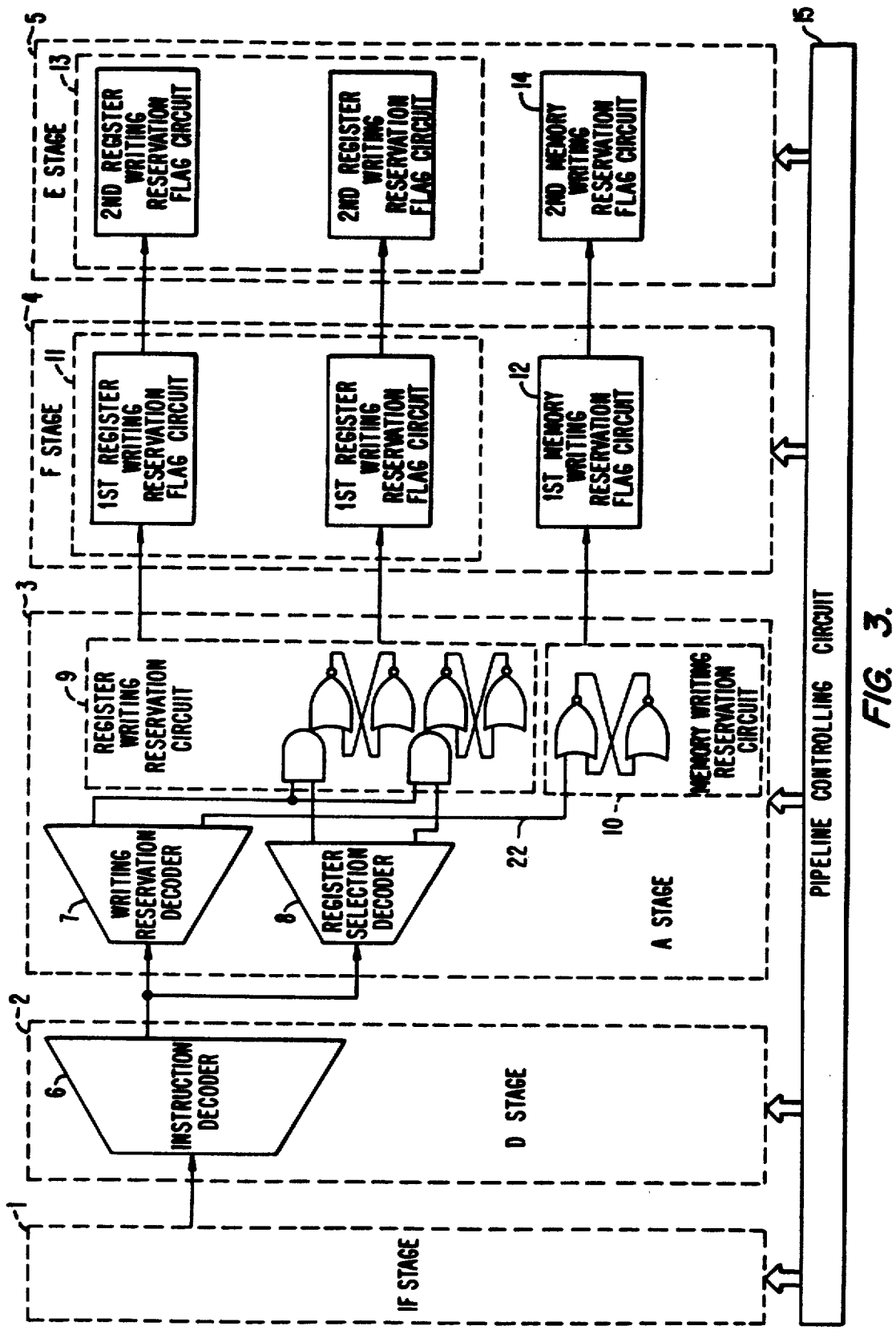
FIG. 3 is a block diagram showing a construction of an example of a pipeline processing mechanism of a data processor of the present invention.

FIG. 3 is a block diagram explaining a construction of a data processor of an embodiment of the present invention, and shows, for example, the case of a five-stage pipeline construction.

In FIG. 3, numeral 1 designates an instruction fetch stage (IF stage), which executes prefetching processing of an instruction. Numeral 2 designates a decoding stage (D stage), which executes decoding the instruction. Numeral 3 designates an operand address calculation stage (A stage) being a first pipeline stage, which executes address calculation of an operand. Numeral 4 designates an operand fetch stage (F stage) being a third pipeline stage, which executes accessing to a micro-ROM and fetching the operand. Numeral 5 designates an execution stage (E stage) being a second or fourth pipeline stage, which executes an instruction.

The IF stage delivers an instruction code to the D stage 2, and information on operation and information on operand address calculation are delivered from the D stage 2 to the A stage 3, and an entry address of a micro-program routine, parameter information and the operand address to a micro-program and information on the accessing mode are delivered from the A stage 3 to the F stage 4, and information on operation control and information on the operand and the operand address are delivered from the F stage 4 to the E stage 5.

Numeral 6 designates an instruction decoder, which decodes an instruction outputted from the IF stage 1 into information on operation and information on operand address calculation. Numeral 7 designates a writing reservation decoder, and numeral 8 designates a register selection decoder. The writing reservation decoder 7 further decodes the information on operation, so that whether or not a writing to a register or a memory is to be executed is judged in the E stage 5, and the result of decode is reserved into a register writing reservation circuit 9 or a memory writing reservation circuit 10. The register selection decoder 8 further decodes the information on the operand, and outputs the decoded result to the register writing reservation circuit 9.

Numeral 11 designates a first register writing reservation flag circuit (installed in the F stage 4), which holds register writing reservation information transferred from the register writing reservation circuit 9 based on a control signal (detailed later) outputted from a pipeline controlling circuit 15.

Numeral 12 designates a first memory writing reservation flag control circuit (installed in the F stage 4), which holds memory writing reservation information transferred from the memory writing reservation circuit 10 based on a control signal (detailed later) outputted from the pipeline controlling circuit 15.

Numeral 13 designates a second register writing reservation flag circuit (installed in the E stage 5), which holds register writing reservation information transferred from the register writing reservation flag circuit 11 based on a control signal (detailed later) outputted from the pipeline controlling circuit 15.

Numeral 14 designates a second memory writing reservation flag circuit (installed in the E stage 5), which holds register writing reservation information transferred from the memory writing reservation flag circuit 12 based on a signal (detailed later) outputted from the pipeline controlling circuit 15.

In addition, when processing on the first instruction executing a writing of an operand of the result of operation to a memory space is executed in the first pipeline stage (A stage 3), the writing of the operand to the memory space is reserved into the operand writing reservation means (the memory writing reservation circuit 10), and when the processing on the first instruction is completed in the second pipeline stage (E stage 5), the content of the reservation latching means (the second memory writing reservation flag circuit 14) is cleared by a reservation latch clearing means (served by the pipeline controlling circuit 15). Also, when processing on the second instruction accessing memory space to execute operand address calculation is executed in the first pipeline stage, operand address calculation is executed while delayed by an operand address calculation inhibiting mechanism (served by the pipeline controlling circuit 15).

Hereinafter, description is made on pipeline controlling operation attending on a conflict between instructions in the pipeline.

An instruction to be processed in the data processor is delivered from the IF stage 1 to the D stage 2 and is decoded by the instruction decoder 6, so that information of operation and information on operand address calculation are delivered to the A stage 3. In the A stage 3, operand address calculation is executed by the information on operand address calculation, and the information on operation is further decoded by the writing reservation decoder 7 to judge whether or not be written to a register or a memory in the E stage 5 is executed. The decoded result on writing is set in the register writing reservation circuit 9 and the memory writing reservation circuit 10. The register writing reservation circuit 9 has reservation circuits as same as a number of registers (two in the drawing), and is reserved by an output of the writing reservation decoder 7 and an output of the register selection decoder 8 for specifying a register. A memory writing reservation flag is only one irrespective of address, and is reserved by an output of the writing reservation decoder 7.

Where one instruction has a plurality of operands, one instruction is decoded while divided into a plurality of units to be processed and writing reservation information is accumulated by writing reservation executed repeatedly.

Such a processing executed in a manner that one instruction is divided into a plurality of units to be processed is described in detail in the Japanese Patent Application Laid-Open No. 61-236456 (1986) or the like.

When processing of one instruction in the A stage 3 is completed, writing reservation information is transferred from the register writing reservation circuit 9 or the memory writing reservation circuit 10 to the F stage 4, and is held in the first register writing reservation flag circuit 11 or the first memory writing reservation flag circuit 12. At the end of processing of the instruction in the F stage 4, writing reservation information is transferred to the flag circuits 13 and 15 in the E stage 5. The writing reservation information is held by any one of the flag circuits 11, 12, 13 and 14 of the stage where the instruction which executed writing reservation is processed, and in the flag circuit 11, 12, 13 or 14 having transferred the writing reservation information, the held writing reservation information is cleared. At the time when processing of the instruction which executed writing reservation is completed in the E stage 5, the second register writing reservation flag circuit 13 or the second memory writing reservation flag circuit 14 is cleared.

For an instruction referring to a memory by memory indirect addressing in executing operand address calculation, when at least one of the memory writing reservation flag circuits 12 and 14 has been set, processing thereof in the A stage 3 is stopped, and waits until all of the memory writing reservation flag circuits 12 and 14 are reset.

Similarly, for an instruction referring to a register in executing operand address calculation in the A stage 3, when at least one of the register writing reservation flag circuits 11 and 13 corresponding to a register to be referred has been set, the processing thereof in the A stage 3 is stopped, and waits until all of the register writing reservation flag circuits 11 and 13 are reset.

In this controlling sequence, writing reservation is made in processing the instruction in the A stage 3, and therefore operand writing reservation of registers and memories to be used for operand address calculation is executed precedingly. For this reason, each instruction never causes a conflict by itself. Transfers of these writing reservation information are all controlled generally by the pipeline controlling circuit 15 (detailed later).

Figure 4:
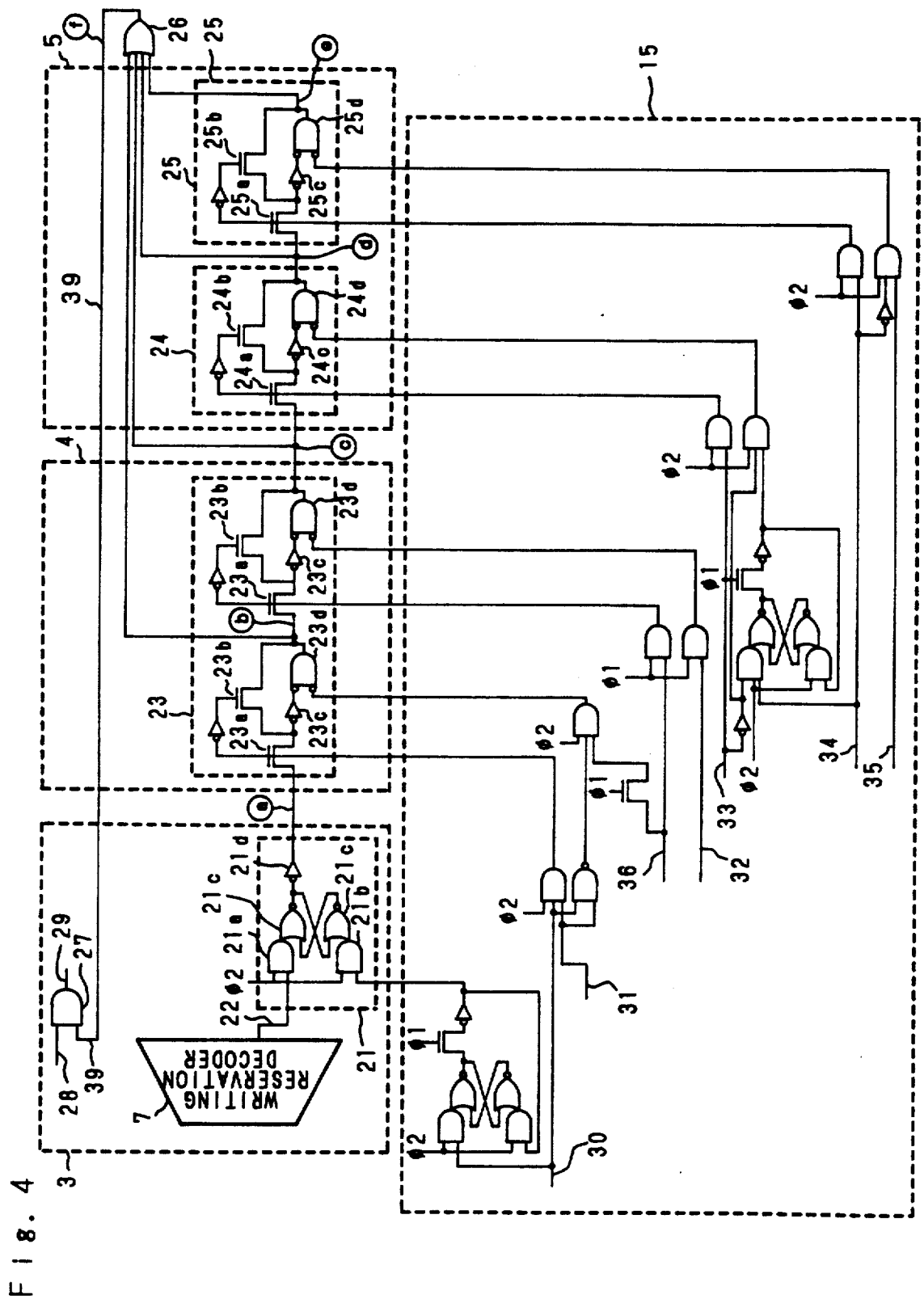
FIG. 4 is a circuit diagram showing a construction of an example of a circuit for transferring writing reservation information thereof.
Figure 5:
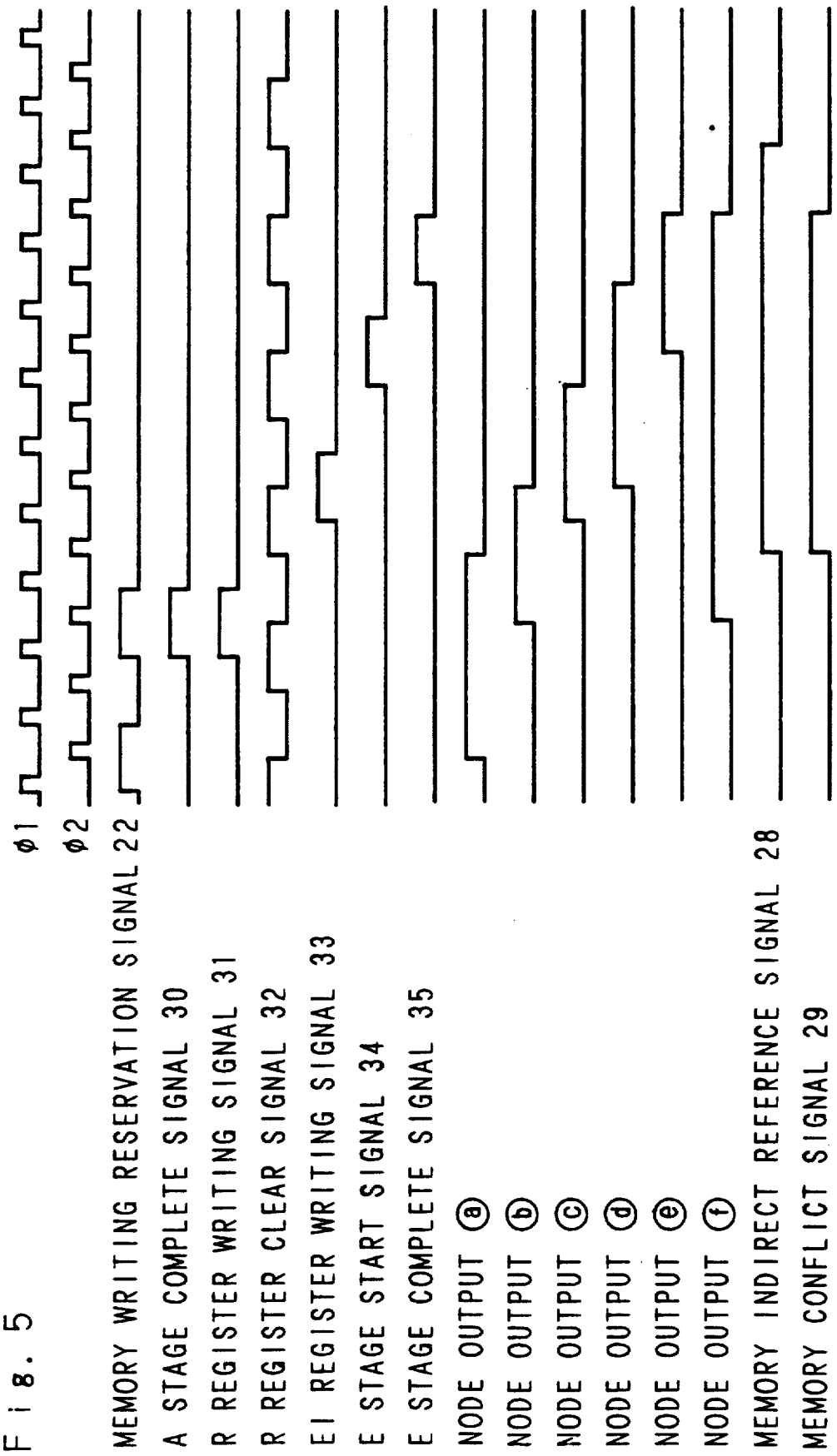
FIG. 5 is a timing chart showing timings of sending signals in the circuit as shown in FIG. 4.

Next, description is made on writing reservation information transfer processing in the data processor as shown in FIG. 3 in reference to FIG. 4 and FIG. 5.

FIG. 4 is a circuit diagram showing an example of a writing reservation information transferring circuit as shown in FIG. 3, and numeral 21 designates a memory writing reservation latch, which comprises AND gates 21a and 21b, a NOR gate 21c an inverter 21d and the like, and a non-duplicate two-phase clock $\phi 2$ and a memory writing reservation signal 22 from the writing reservation decoder 7 are inputted to the AND gate 21a, being outputted to a R register 23 of the F stage 4.

The R register 23 has a master-slave construction, and is composed of transmission gates 23a and 23b, an inverter 23c, a NOR gate 23d and the like, and transfers writing reservation information to an EI register 24 of the following E stage 5.

Numeral 25 designates an E register, which receives the writing reservation information through the EI register 24.

Numeral 26 designates an OR gate, which makes OR (logical add) operation of outputs of the NOR gates 23d of the slave side and master side of the R register 23, an output of the EI register 24, an output of the E register 25 and the like (processing detecting the set state of the memory writing reservation flag), and outputs a writing reservation signal 39 to an AND gate 27 of the A stage 3.

In addition, to one input of the AND gate 27, a memory indirect reference signal 28 is inputted, and an AND output with the above-mentioned writing reservation signal 39 is outputted as a memory conflict signal 29. During this memory conflict signal 29 is "1", operand address calculation in the A stage 3 is inhibited.

Thus, in the data processor of the present invention, a one-bit writing reservation information transfer line is installed in each stage, and writing reservation information of a memory or register outputted from the writing reservation decoder 7 or the register selection decoder 8 is sequentially transited and transferred to a flag circuit corresponding to the following stage, and thereby the writing reservation information is informed to the E stage 5. Then, the set state of writing reservation information for each stage is detected by the OR gate 26 by the OR logical operation, and during and after transfer of writing reservation information for an instruction to any stage, a start of operand address calculation in the A stage 3 is delay-controlled until a writing to a memory or register by the E stage 5 is completed.

In addition, the memory writing reservation latch 21 in the A stage 3 is reset by a A stage complete signal 30 outputted from the pipeline controlling circuit 15, and the latched writing reservation signal is transferred to the F stage 4 by an R register writing signal 31.

Also, the R register 23 of the F stage 4 transfers the writing reservation signal transferred to the master side to the slave side by a R register read signal 36 outputted from the pipeline controlling circuit 15, being cleared by an R register clear signal 32.

Furthermore, the EI register 24 of the E stage 5 receives the writing reservation signal from the R register 23 by an EI register writing signal 33 outputted from the pipeline controlling circuit 15, and receives the writing reservation signal from the EI register 24 by an E stage start signal 34, being cleared by an E stage complete signal 35. In addition, (ⓐ) through (ⓕ) in the drawing show each node output.

FIG. 5 is a timing chart explaining a timing of sending each signal as shown in FIG. 4.

The memory writing reservation signal 2 is outputted from the writing reservation decoder 7, and sets the memory writing reservation latch 21. When one instruction executes a writing to a memory for a plurality of operands, the memory writing reservation signal 22 sets the memory writing reservation latch 21 by the number of times of the writing. Finally at a time when address calculation processing of one instruction is completed, the memory writing reservation information is sent from the memory writing reservation latch 21 to the F stage 4 by the A stage complete signal 30 and the R register writing signal 31, and the memory writing reservation latch 21 is reset.

When the writing reservation information is transferred to the F stage 4, the R register 23 which is the memory writing reservation flag of the F stage 4 and has a master-slave construction simultaneously executes a take-in of memory writing reservation information of the next instruction and a transfer of the memory writing reservation information to the E stage 5. The memory writing information is transferred to the slave by the R register read signal 36, and the master of the R register 23 is cleared when memory writing reservation information of the next instruction is not inputted.

When processing of the instruction is completed in the F stage 4, the memory writing reservation information is transferred to the E stage 5 by the EI register writing signal 33 for the EI register 24, and the slave side of the R register 23 is overwritten by input information from the master side of the R register 23.

When the EI register 24 receives the memory writing reservation information from the F stage 4, the memory writing reservation information inputted from the EI register 24 being an input register is transferred to the E register 25 by the E stage start signal 34, and when reservation information of the next instruction is not inputted, the EI register 24 is cleared. The memory writing reservation information inputted to the E register 25 is cleared by the E stage complete signal 35 when the E stage processing is completed.

Thus, the memory writing reservation information is transferred through the pipeline in synchronism with the instruction transferred through the pipeline, and is cleared when a writing to a memory is executed and the processing of the instruction is completed in the E stage 5.

In addition, when the pipeline controlling circuit 15 as a pipeline controlling means processes the first instruction in the F stage 4 as the third pipeline stage, the first flag information holding part (the memory writing reservation flag circuit 12) is set, and when processing of the first instruction moves from processing in the third pipeline stage to processing in the fourth pipeline stage (E stage 5), the content of the memory writing reservation flag circuit 12 is transferred to the second flag information holding part (the memory writing reservation flag circuit 14), and the memory writing reservation flag circuit 12 is cleared, and thereby information is moved in sequence in the flag information holding means. Also, the pipeline controlling circuit 15 controls execution of processing on the second instruction in the third pipeline stage according to an output of the flag information holding state detecting means (comprised of the OR gate 26, the AND gate 27 and the like).

Hereinafter, description is made on operation in FIG. 4.

An output of the memory writing reservation flag of each stage is OR-operated by the OR gate 26, being inputted to the AND gate 27. The instruction referring to a memory in the A stage 3 sets the memory indirect reference signal 28 to "1". Consequently, where the instruction preceding in the pipeline has made at least one memory writing reservation, the memory conflict signal 29 is turned to "1", and the A stage 3 stops processing of the instruction. Then, when the instructions which reserved memory writing, that is, the preceding instructions are all processed in the E stage 5, and the conflict signal 29 is turned to "0", the A stage 3 resumes processing of the instruction.

In addition, in the above-mentioned embodiment, description is made on transfer of the memory writing reservation information, but the register reservation information can also be transferred by similar hardware. Particularly, the number of register reservation information is the same as the number of registers, and register reservation and generation of the register conflict signal are executed independently on a register basis.

Specifically, the instruction which refers to a register in the A stage 3 turns the register indirect reference signal 28 to "1", and when the instruction preceding in the pipeline has made reservation of a writing to at least one corresponding register, the register conflict signal is turned to "1", and the A stage 3 stops processing. Then, the instructions which reserved writing to a register are all processed in the E stage 5, and when the register conflict signal is turned to "0", the A stage 3 resumes processing.

In addition, where the E stage 5 executes a jump instruction or an interruption, when a jump takes place, the instructions in the pipeline are canceled, and the IF stage 1 starts to newly fetch the instruction of jump destination. At this time, register writing reservation information and memory writing reservation information are cleared like the instructions in the pipeline. Reset inputs are given to the register writing reservation flag and the memory writing reservation flag, being cleared when a jump takes place in the E stage 5.

At this time, the memory writing reservation latch 21 is cleared by the A stage complete signal 30, the R register 23 is cleared by the R register read signal 36 and the R register clear signal 32, the EI register 24 is cleared by the E stage start signal 34, and the E register 25 is cleared by the E stage complete signal 35, respectively.

Also, in the above-mentioned embodiment, description is made on the case of executing one memory writing reservation and one conflict check for the whole memory space, but it is also possible that the memory space is divided into a plurality of spaces and writing reservation and conflict check are executed on a divided space basis.

Furthermore, the above-mentioned embodiment has a construction that the instruction executing a writing to a memory executes writing reservation and conflict check, but a construction can also be adopted that conflict check is executed depending on that an instruction is present or absent in the pipeline. In this case, a flag information holding circuit corresponding to each pipeline stage has instruction presence information of each stage, respectively. When an instruction exists in the pipeline stage, the flag is turned to "1", and when no instruction exists, the flag is "0". When an instruction is transferred in the pipeline, corresponding thereto, the flag indicating presence of the instruction is transferred in the flag information holding circuit. Each flag information holding circuit, when processing of that stage is completed, sends the flag indicating presence of the instruction to the next pipeline stage, and clears flag information. Logical Or operation of all outputs of flag information holding circuits of the stages following the stage of executing operand address calculation is made, an whether or not instructions exist in the stages following the address calculating stage is checked. When at least one instruction exists in the following stages, a logical add (an OR) signal is turned to "1", and when all instructions in the following stages have gone, the logical add (OR) signal is turned to "0". Where the instruction processed in the address calculating stage executes address calculation referring to a memory, the logical add (OR) signal of outputs of the flag information holding circuits is checked, and absence of instructions in the following stages is made sure, and thereafter address calculation is executed. When the logical add (OR) signal is "1", there is a possibility that an instruction in the following stage writes to a memory, and therefore execution of address calculation is stopped, and after all of processings of instructions in the following stages have been completed and the logical add (OR) signal has been turned to "0", the address calculation is executed. It is also possible to execute memory conflict in such a manner.

As described above, the data processor of the present invention is construction with the pipeline processing mechanism comprising the first pipeline stage executing operand address calculation and the second pipeline stage executing a writing of the operand of the operation result, the operand writing reservation means for reserving a writing of the operand to memory space in executing processing on the first instruction executing a writing of the operand of the result of operation to memory space in the first pipeline stage, one or a plurality of reservation latching means for holding an output of this operand writing reservation means, the reservation latch clearing means for clearing the contents of the one or a plurality of reservation latching means in processing the first instruction in the second pipeline stage, and the operand address calculation inhibiting means for inhibiting operand address calculation in the first pipeline stage based on the content of reservation latch in executing processing on the second instruction accessing memory space to make operand address calculation in the first pipeline stage, and only the instruction referring to a memory in the operand calculation stage is put in the state of waiting processing due to a memory conflict, and disorder of the pipeline processing is reduced to a great extent, and thereby the efficiency of pipeline processing can be raised. Also, the memory writing reservation flag exists for each stage constructing the pipeline, and therefore it is made possible that memory writing reservation information by a plurality of instructions is held in the pipeline.

Also, the data processor further comprises the first flag information holding part which is a register circuit of one bit being inputted the input data signal, the input enable signal and the clear signal and outputting the output signal, the second flag information holding part which is a register circuit of one bit being inputted the input data signal, the input enable signal and the clear signal and outputting the output signal, the flag information holding means which is comprised of a series connection of the first flag information holding part and the second flag information holding part corresponding to the third pipeline stage and the fourth pipeline stage, the flag information holding state detecting means for detecting the flag information holding state in the flag information holding means while making logical OR operation of each output of the first flag information holding part and the second flag information holding part, and the pipeline controlling means which sets the first flag information holding part when the first information is processed in the third pipeline stage, transfers the content of the first flag information holding part to the above-mentioned second flag information holding part when processing of the first instruction moves from processing in the fourth pipeline stage, sequentially moves information in the flag information holding means by clearing the above-mentioned first flag information holding part, and controls processing on the second instruction accessing memory space to execute operand address calculation according to an output of the flag information holding state detecting means, and can transfer memory writing reservation information/register writing reservation information to each stage in the pipeline while clearing memory writing reservation information/register writing reservation information held in each stage, and can automatically clear all memory writing reservation information/register writing reservation information in the pipeline at the point of completing execution of the instruction in the instruction execution stage, and can remarkably improve the efficiency of pipeline processing. Thus, the present invention has excellent effects.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processor for processing a first instruction writing an operand to a memory and a subsequent second instruction reading from the memory, comprising:
   a pipeline processing mechanism including a plurality of serially-coupled pipeline stages, comprising a first pipeline stage for reading an operand address from a memory so as to calculate the operand address and a second pipeline stage subsequent to said first pipeline stage, for writing an operand to the memory;
   a plurality of latching means, only a single one coupled respectively and correspondingly to said first pipeline stage and to each stage of said pipeline processing mechanism subsequent to said first pipeline stage up to and including said second pipeline stage; for storing a bit which inhibits a calculation of operand addresses, read from said memory, in said first pipeline stage;
   means for writing reservation information for writing an operand to said memory, coupled to said first pipeline stage, for asserting a predetermined reservation signal for writing an operand to said memory in latching means of reservation information for writing an operand to said memory in said first pipeline stage corresponding to said first stage responsive to the first instruction;
   transferring means, coupled to said plurality of latching means, for transferring said predetermined reservation signal for writing an operand to said memory among said plurality of latching means to corresponding latching means in response to moving of the first instruction within said pipeline processing mechanism to said second pipeline stage; and
   means for inhibiting address calculation read from a memory, coupled to said first pipeline stage and to said plurality of latching means, for inhibiting address calculation read from a memory of an operand for the second instruction in said first pipeline stage based on an assertion of any of said predetermined reservation information for writing an operand to said memory signals stored in the latching means until said second pipeline stage writes said operand to the memory the second instruction requests access to, and deasserts all said predetermined writing reservation signals in said latching means.

2. In a data processor having a pipeline processing mechanism including a plurality of serially-coupled pipeline stages, the pipeline mechanism comprising a first stage for sequentially processing a first instruction and a second instruction which follows said first instruction and accesses a memory space to calculate an operand address and a second pipeline stage following said first pipeline stage, said data processor comprising:
   flag information holding means, coupled to the first stage, the second stage and each stage between the first stage and the second stage of the serially-coupled pipeline stage being provided with:
     a first flag information holding part comprising a one-bit register circuit which receives an input data signal, an input enable signal and a clear signal, which outputs an output signal, and which is set with predetermined information corresponding to the first pipeline stage; and
     a second flag information holding part, coupled to a flag information holding part of a pipeline stage prior to the second pipeline stage, comprising a one-bit register circuit which receives an input data signal, an input enable signal and a clear signal, which outputs an output signal, and which is set with predetermined information corresponding to the second pipeline stage; and intermediate flag information holding parts exist separately in those respective pipeline stages between said first pipeline stage and said second pipeline stage, said flag information holding parts which are same-structured one-bit register circuits are connected in series with the first flag information holding part as a head and a second flag information holding part as an end, said first, said second, and said intermediate flag information holding parts part of said flag information holding means;

flag information holding state detecting means, coupled to said flag information holding means, for detecting the flag information holding state of said flag information holding means by making logical OR operation of outputs of said flag information holding parts other than said first flag information holding part; and pipeline controlling means, coupled to said flag information holding means, for:

setting said predetermined information in said first flag information holding part at processing the first instruction in said first pipeline stage;

transferring a content of said first flag information holding part to a flag information holding part of a pipeline stage next to said first pipeline stage when processing of said first instruction moves from processing in said first pipeline stage to processing in said pipeline stage next to said first pipeline stage;

moving sequentially information in said flag information holding means by, in the case when new flag information is transferred from a previous pipeline stage, the flag information holding part becomes input enable and latches transferred flag information, otherwise in the case when new flag information is not transferred from a previous pipeline stage, the flag information is cleared be a clear signal, wherein flag information is transferred; and controlling processing on the second instruction accessing the memory to calculate the address of the operand according to an output of said flag information holding state detecting means which asserts an address calculation inhibit signal to the first pipeline stage if said second pipeline stage has not written the operand to the memory to be read by the second instruction.

3. In a data processor having a pipeline in the form of a plurality of serially connected processing stages including an instruction decode stage, an address calculation stage following the instruction decode stage, and an instruction execution stage following the address calculation stage, with each stage for processing an instruction, where the pipeline shifts a series of instructions from stage to stage to perform pipeline processing on a series of instruction, and with the data processor coupled to a memory written to by the execution stage in response to its processing a write instruction and read from by the address calculation stage in response to its processing a read instruction, a system for managing conflicts between accesses of the memory during pipeline processing comprising:

a flag information holding means for associating a write instruction with a particular stage of the pipeline, the flag information holding means including a plurality of serially connected flag information holding parts, with each stage of the pipeline corresponding to one of the flag information holding parts in said plurality, and with the first one of said flag information holding parts in the plurality corresponding to the address calculation stage;

means, at the address calculation stage, for setting, during processing of the write instruction, a flag information in said first storage means of said flag information holding means;

means for shifting said flag information to a selected following flag information holding part in said flag information holding means when said write instruction is being processed in the stage of said pipeline corresponding to said selected following flag information holding part;

address decode means for setting a read signal indicating that the memory is to be read during the processing of the read instruction at the address calculation stage;

flag information holding state detecting means, having a set of inputs for receiving the flag information stored in said flag information holding parts corresponding to those pipeline stages following the address calculation stage, with said flag information holding state detecting means setting an address calculation inhibit signal only when at least one of said received flag information are set;

pipeline control means, having an input for receiving said address calculation inhibit signal, for halting processing at the address calculation stage and preceding stages when said address inhibit signal is set.

* * * * *